United States Patent
Drees et al.

(10) Patent No.: US 9,688,926 B2
(45) Date of Patent: Jun. 27, 2017

(54) SAMP COATED LEVEL SENSOR, METHOD OF TREATING A LEVEL SENSOR, AND METHOD OF INSTALLING LEVEL SENSOR INTO CRUDE OIL SERVICE OPERATION

(71) Applicant: ELECTROLAB, INC., Boerne, TX (US)

(72) Inventors: Sean Eric Drees, Boerne, TX (US); Andrew Timothy Marzec, San Antonio, TX (US); Brian Keith Brashear, San Antonio, TX (US)

(73) Assignee: ELECTROLAB, INC., Boerne, TX (US)

( * ) Notice: Subject to any disclaimer, the term of this patent is extended or adjusted under 35 U.S.C. 154(b) by 0 days.

(21) Appl. No.: 15/164,842

(22) Filed: May 25, 2016

(65) Prior Publication Data
US 2016/0348014 A1 Dec. 1, 2016

Related U.S. Application Data

(63) Continuation of application No. 14/099,497, filed on Dec. 6, 2013, now Pat. No. 9,476,754.
(Continued)

(51) Int. Cl.
*G01F 23/64* (2006.01)
*C10G 75/04* (2006.01)
(Continued)

(52) U.S. Cl.
CPC ........... *C10G 75/04* (2013.01); *C09D 7/1233* (2013.01); *C10G 75/00* (2013.01); *C10G 75/02* (2013.01);
(Continued)

(58) Field of Classification Search
CPC ....... C10G 75/00; C09D 7/1233; G01F 23/64; Y10T 29/52; Y10T 29/49885; B82Y 15/00
(Continued)

(56) References Cited

U.S. PATENT DOCUMENTS 4,972,709 A * 11/1990 Bailey, Jr. ........... E21B 17/1035
200/308
5,862,702 A * 1/1999 Liang ..................... G01F 23/64
200/84 C
(Continued)

OTHER PUBLICATIONS

Rodger, PM, "The Effect of Corrosion Inhibitor Films on Deposition and Adhesion of Paraffin Wax to Metal Surfaces", EPSRC Reference GR/L73739, U of Warwick, Apr. 1, 1999-Dec. 31, 1999.
(Continued)

*Primary Examiner* — Lisa Caputo
*Assistant Examiner* — Nathaniel T Woodward
(74) *Attorney, Agent, or Firm* — Gilbreth Roebuck, P.C.; J. M. (Mark) Gilbreth

(57) ABSTRACT

A level sensor, method of treating cooperating surfaces of a level sensor, and method of installing a level sensor, wherein the level sensor may include an elongated tube having an outer surface, and a float carrier having an inner surface, and wherein the outer surface and the inner surface form cooperating surfaces, and wherein at least one of the surfaces comprises a Self-Assembled Monolayer of Phosphonate (SAMP). The method of treating cooperating surfaces includes applying a coat of a Self-Assembled Monolayer of Phosphonate (SAMP) composition to at least one of said cleaned and dried surfaces of said tube and float carrier to form treated components. The method of installing may include installing said level sensor into a section of a crude oil service operation.

9 Claims, 6 Drawing Sheets

Related U.S. Application Data

(60) Provisional application No. 61/770,963, filed on Feb. 28, 2013.

(51) Int. Cl.
*C10G 75/00* (2006.01)
*C09D 7/12* (2006.01)
*C10G 75/02* (2006.01)
*F16L 58/04* (2006.01)
*B82Y 15/00* (2011.01)

(52) U.S. Cl.
CPC .............. *F16L 58/04* (2013.01); *G01F 23/64* (2013.01); *B82Y 15/00* (2013.01); *Y10T 29/49885* (2015.01); *Y10T 29/52* (2015.01)

(58) Field of Classification Search
USPC .......................................................... 73/305
See application file for complete search history.

(56) References Cited

U.S. PATENT DOCUMENTS

| | | | |
|---|---|---|---|
| 6,146,767 A | 11/2000 | Schwartz | |
| 6,185,994 B1 * | 2/2001 | Liang | G01F 23/72 73/114.56 |
| 7,268,363 B2 | 9/2005 | Koch et al. | |
| 6,983,655 B2 * | 1/2006 | Liang | G01F 23/72 73/313 |
| 7,471,503 B2 | 3/2007 | Koch et al. | |
| 7,396,594 B2 | 7/2008 | Schwartz et al. | |
| 7,625,149 B2 | 12/2009 | Hanson et al. | |
| 7,691,478 B2 | 4/2010 | Avaltroni et al. | |
| 7,740,940 B2 | 6/2010 | Hanson | |
| 7,879,437 B2 | 2/2011 | Hanson | |
| 7,879,456 B2 | 2/2011 | Schwartz et al. | |
| 7,901,777 B2 | 3/2011 | Hanson | |
| 7,989,069 B2 | 8/2011 | Bruner et al. | |
| 8,025,974 B2 | 9/2011 | Hanson | |
| 8,048,487 B2 | 11/2011 | Hanson | |
| 8,053,081 B2 | 11/2011 | Petcavich | |
| 8,067,103 B2 | 11/2011 | Hanson | |
| 8,236,426 B2 | 4/2012 | Hanson et al. | |
| 8,178,004 B2 | 5/2012 | Hanson | |
| 8,337,985 B2 | 12/2012 | Hanson | |
| 8,432,036 B2 | 4/2013 | Hanson et al. | |
| 8,445,423 B2 | 5/2013 | Bruner et al. | |
| 8,524,367 B2 | 9/2013 | Hanson | |
| 8,558,117 B2 | 10/2013 | Hanson | |
| 8,658,258 B2 | 2/2014 | Hanson | |
| 2008/0131709 A1 | 6/2008 | Hanson et al. | |
| 2009/0246394 A1 | 10/2009 | Hanson et al. | |
| 2011/0252884 A1 * | 10/2011 | Hanscombe | G01L 9/0008 73/32 A |
| 2012/0003481 A1 | 1/2012 | Hanson et al. | |
| 2012/0104362 A1 | 5/2012 | Hanson et al. | |
| 2013/0037161 A1 | 2/2013 | Hanson et al. | |
| 2014/0134426 A1 * | 5/2014 | Henry | B05D 5/00 428/327 |
| 2014/0272149 A1 | 9/2014 | Hanson | |
| 2014/0272150 A1 | 9/2014 | Hanson | |
| 2014/0272428 A1 | 9/2014 | Hanson | |
| 2015/0083397 A1 | 3/2015 | Monroe et al. | |
| 2015/0252656 A1 | 9/2015 | Hanson | |

OTHER PUBLICATIONS

Safety Data Sheet for NanoClear Treatment, Aculon, Jul. 9, 2015.
Nanoclear Additional Instructuons instruction sheet, Aculon, undated.
Nanoclear Metal Treatment Instuctions for Use, Aculon, undated.
Safety Data Sheet for NanoClear Primer, Aculon, Jul. 9, 2015.

* cited by examiner

SAMP COATED LEVEL SENSOR, METHOD OF TREATING A LEVEL SENSOR, AND METHOD OF INSTALLING LEVEL SENSOR INTO CRUDE OIL SERVICE OPERATION

CROSS-REFERENCE TO RELATED APPLICATION DATA

This utility application is a continuation of U.S. patent application Ser. No. 14/099,497, filed Dec. 6, 2013, which claims priority to U.S. Provisional Patent Application Ser. No. 61/770,963 filed Feb. 28, 2013, both of which are incorporated herein by reference for all purposes.

FIELD OF THE INVENTION

The present invention relates to paraffin and asphaltene deposition on components used in crude oil service operations. In another aspect, the present invention relates to coatings for reduction of paraffin and asphaltene deposition on stainless steel and nickel alloy components utilized in crude oil service. In even another aspect, the present invention relates to anti-paraffin coatings to address paraffin/asphaltene deposition on stainless steel and nickel alloy sensor components. In still another aspect, the present invention relates to unique application of commercially available nano-coatings for the reduction of paraffin and asphaltene deposition on stainless steel and nickel alloy components utilized in crude oil service. In yet another aspect, the present invention relates to a method and kit for surface treatment of cooperating, controller or sensor components used in crude oil service operations to reduce paraffin/asphaltene deposition.

BACKGROUND OF THE INVENTION

Paraffins, more commonly referred to as alkanes, are the chemical family of saturated hydrocarbons that result from combining $CH_2$ groups in succession. Additional $CH_2$ groups are added to form straight-chain paraffins.

The term "wax" simply refers to saturated hydrocarbons that contain more than 16 carbon atoms in the paraffin series ($C_{16}$-$C_{40}$) and are in a solid state at room temperature. The majority of waxes present in crude oil are considered synthetic paraffin waxes with non-oxidized saturated alkanes.

Paraffins may exist in crude oil in all three states. At standard room temperature, $C_{16}$+n-paraffins generally exists in a solid form and solidify to form deposits. Wax is the product of paraffin deposition, so in the industrial context, "wax" and "paraffin" are often used interchangeably.

Therefore, "paraffin wax deposition" refers to the solid form of paraffins that solidify to cause deposition.

Because asphaltene is typically talked about in the same context as paraffin, it is important to understand what asphaltene is and why it is problematic to the crude oil service operations. Asphaltene is the material present in petroleum that is insoluble in n-paraffins but soluble in aromatic solvents. Asphaltenes cause catalyst deactivation and sediment formation.

Tars or asphaltenes occur in many crudes as colloidally suspended solid particles. Precipitation takes place when the crude loses its ability to keep those particles dispersed. Many of the same factors affecting paraffin deposition (discussed below) also affect asphaltene deposition.

Paraffins precipitate out of waxy crudes when there is a slight change in equilibrium conditions, causing a loss of solubility of the wax in the crude. A lowering in temperature is the most common cause of paraffin precipitation.

Thus, hydrocarbon liquids, including both crude oils and condensates, form a paraffin or asphaltene solid phase when process temperatures fall below the cloud point (or Wax Appearance Temperature) of the liquid. While this normally occurs in colder temperature services, it may also occur in any process where the combination of complex composition factors, such as API gravity, pressure/temperature variables and other factors favor deposition.

The presence of asphaltenes increases the difficulties for paraffin wax treatments because these structures are almost always found in association with waxes when they are retrieved from wells, storage tanks, or pipelines (Becker J. R. 1997, *Crude oil waxes, emulsions, and asphaltenes*. Tulsa, Okla.; PennWell Publishing Company). While paraffin wax deposition may be reduced by increasing the flow velocity of crude, increasing fluid velocities increases the likelihood of asphaltene deposition.

Further, studies show that the amount of asphaltene precipitation decreases as the number of carbons forming straight-chain paraffins increases. In other words, treatment of paraffin wax could escalate the precipitation of heavier, problematic asphaltene compounds. Therefore, treatment of paraffin and asphaltene deposition must both be considered in the balance.

Once formed, these paraffin/asphaltene solids will typically deposit on tank-mounted level sensors and instrumentation. This deposition presents a potential safety hazard when critical operational and/or safety sensors are affected. This may cause a loss of billions of dollars per year worldwide through the enormous cost of remediation, reduced or deferred production, well shut-ins, equipment replacements and/or abandonments, equipment failures, extra horsepower requirements, and increased manpower needs.

The modern petroleum industry has developed new technologies for controlling the deposition of petroleum paraffin and asphaltenes, particularly in wells, storage tanks, and pipelines. However, these technologies have been less effective on sensitive tank level sensors, flow sensors, and other instrumentation. Traditional methods of management and remediation have been established for many years and include the following:

a. Chemical Treatments and Additives: While chemical treatments help to manage solids deposition in connected lines, instrument tubing and storage tank internal components, some chemicals do not suspend the paraffin indefinitely and may be damaging to the environment.

b. Hot Oiling: Hot oiling is one method often employed for removing deposition in storage tanks. Paraffin and asphaltene buildup is handled by periodically pumping very hot oil, augmented by cleansing additives, into the vessels in order to melt the accumulations from tank walls, sensors and internal equipment.

c. Manual Cleaning: During normal maintenance operations, internally mounted equipment may be periodically subject to manual cleaning. This typically involves removal of sensors, instruments, etc. from out-of-service tanks and process equipment for cleaning. Alternately, personnel may physically enter out-of-service tanks to perform the cleaning with sensors and equipment in place. These methods typically involve considerable expense in time and labor for taking equipment out of service, the cleaning process itself, and management of safety associated with hazardous conditions, including hydrogen sulfide (H2S) exposure.

However, these procedures are labor and cost intensive and are not very effective with sensitive sensors and instrumentations. The solution is to avoid wax and asphaltene depositions in the first place.

SUMMARY OF THE INVENTION

The AP (Anti-Paraffin) Coating composition of the present invention provides a unique and cost-effective way for petroleum facility owner/operators to address common paraffin/asphaltene deposition on cooperating stainless steel and nickel alloy sensor components and instrumentation. It is anticipated that the present method may be utilized with a wide range of metals as well as non-metallic components.

The present invention is a new application of a modified, existing, chemical technology representing a significant potential for reduction in typical labor and costs of paraffin/asphaltene remediation in critical process instrumentation and the elimination of associated hazards. Using available nano-coating materials applied to cooperating surfaces of subject components produces permanent changes in the molecular characteristics of subject component metal, wetted parts and/or entire sensor assemblies, making them highly resistant to solids deposition in the extreme process environments normally encountered in petroleum production facilities. The present invention provides improved reliability of sensors and devices, as well as providing improved operational and maintenance personnel safety. Again, the key strategy is to avoid the initial affixation of the paraffin and asphaltene deposits on the surface subject components.

BRIEF DESCRIPTION OF THE FIGURES

FIGS. 4A-4C illustrate capacitance sensors having cylindrical outer housings.

FIGS. 4D-4E show an alternative embodiment of a capacitance sensor having a generally rectangular outer housing.

FIG. 4F is a perspective view of the embodiment of FIGS. 4D and 4E.

DETAILED DESCRIPTION OF A PREFERRED EMBODIMENT

The present invention to create resistance to and/or reduce paraffin/asphaltene deposition on stainless steel and nickel alloy components utilizes a composition known as a Self-Assembled Monolayer of Phosphonate (SAMP). SAMP is commercially available from a wide range of suppliers. Typically, SAMP is utilized with an alcohol-based carrier which allows for rapid drying. It is anticipated that the SAMP may be combined with a glycol carrier for use in the treatment of components used in crude oil service operation.

A monolayer is a nanoscale coating that is one molecule thick or 1-4 nanometers in thickness (1 nm=1×10−9 meters).

A phosphonate is a phosphorous acid connected with a carbon-based group through a highly stable phosphorus carbon bond.

The phosphonic acid reacts with the component surface through stable metal phosphorus bonds, and the carbons are chosen for their non-stick chemical functionality. The SAMP is covalently bound to the substrate, forming a durable, low-surface tension, non-stick surface. This permanent chemical bond is highly stable under ambient conditions. Currently, an alcohol-based carrier is combined with the SAMP in some applications, but using a glycol-based carrier is unique in crude oil environments.

Through standard Dyne pen testing, surface energy is shown to be significantly and permanently reduced through application of a nano-coating to the tested component. Field trials with components treated via the present inventive process indicate a significant reduction of paraffin/asphaltene deposition on stainless steel sensor components installed in crude oil storage tanks operated in low acidity/low turbulence applications at normal temperatures.

Figure 1:
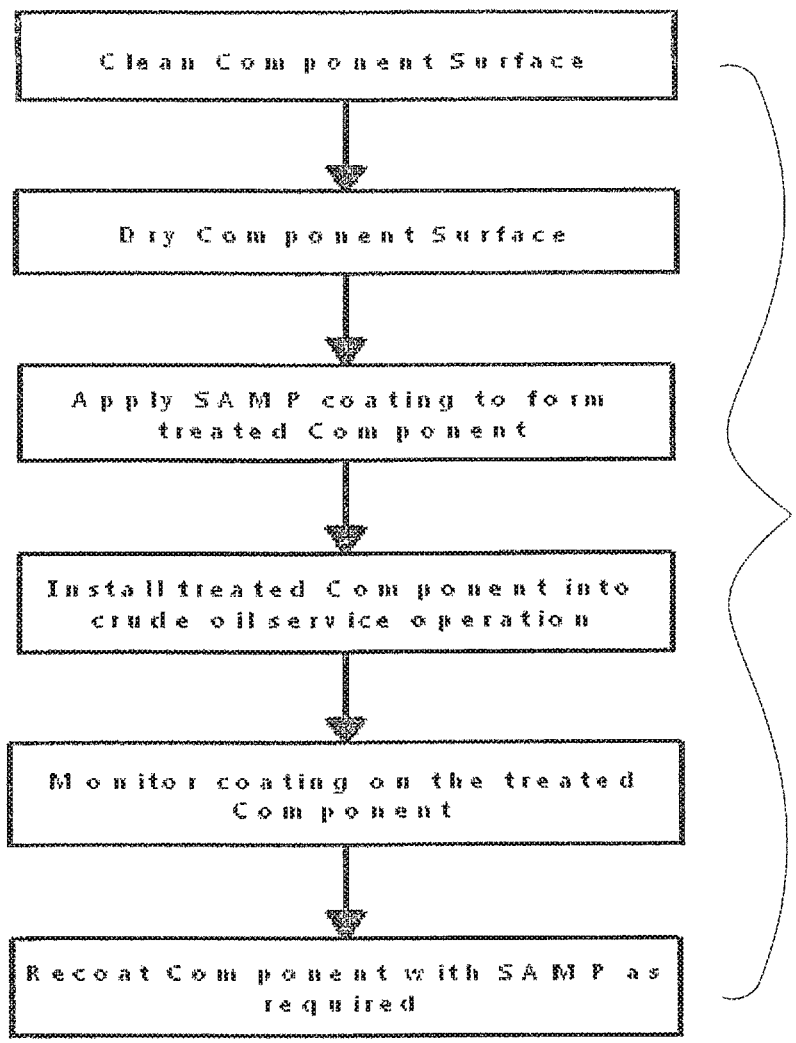
FIG. 1 illustrates a diagram of the present invention method showing the process steps.

The present inventive process may be utilized in the manufacture of sensors and instrumentation for a crude oil service operation. As a non-limiting embodiment, a typical application method during manufacture involves a simple two-part process in which a cleaner/primer wipe is manually applied to prepare the surface of the stainless steel or nickel allow components and rinsed with di-ionized water to remove dirt, grease, etc. After the initial cleaning/preparation step and drying, a nano-coating wipe is manually applied directly to the component to be protected. The method is simple: clean, dry, apply, insert, and monitor process, as illustrated in FIG. 1.

Figure 3:
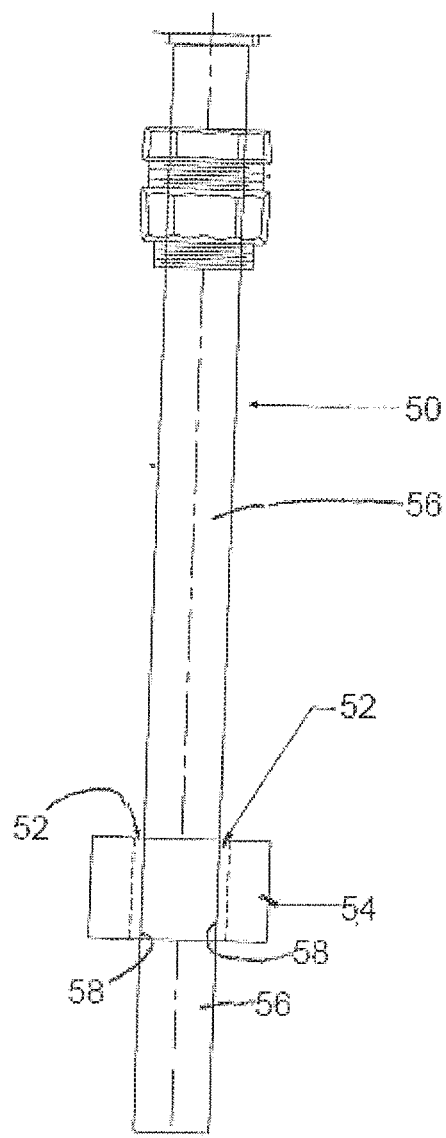
FIG. 3 is a basic illustration of some components of a digital level sensor described in this application.

As an example, the manufacture of a vertical crude oil storage tank level sensor includes a continuous 316L, square, stainless steel outer tubing that cooperates with the float carrier and all electronic sensor components and switches that are activated by the movement of float carrier to measure the level of the liquid in the storage tank. FIG. 3 shows the square tubing 50 of a digital level sensor (DLS), a float carrier 52 with floats members 54 attached to the carrier 52. During operation, the outer surface 56 of tubing comes into contact with the inner surface 58 of the carrier 52. This sliding contact between the tubing 50 and the inner surface 58 of the float carrier 52 is adversely affected if paraffin or asphaltene deposits build up on these surfaces. When deposits build up on the surfaces of the components, the float carrier 52 does not freely move up and down the tubing 50, thereby causing false level readings in the digital level sensor. The outer tubing extends the entire length of the sensor from top tank connection to the bottom of the sensor. After assembly and testing, the sensor is disassembled and the nano-treatment is completed in the following steps:

a. The sensor assembly including the stainless steel tubes 50, float carrier 52, and floats 54 are placed on horizontal support racks. The entire sensor assembly is thoroughly cleaned on all sides with an alcohol or phosphate-based detergent laden sponge or wipe 60 to remove any mill oil, dirt, grease, etc. and liberally flushed with clean water. This process step is repeated until all visual indications of surface contaminants are removed.

b. The assembly is thoroughly dried using clean, lint-free cloth or absorbent paper towels.

c. Immediately after drying, the nano-treatment chemical composition of the present invention (SAMP) is directly applied to the clean outer tube surfaces 56 and the inner carrier surfaces 58 of the assembly parts with a soft cloth or wipe 62 impregnated with the SAMP composition and gently rubbed into the outer surface 56 and inner surface 58 in order to assure complete chemical coverage. After approximately 1 minute of contact time, excess SAMP composition residue is removed and the complete assembly is thoroughly dried and reassembled.

Figure 4A:
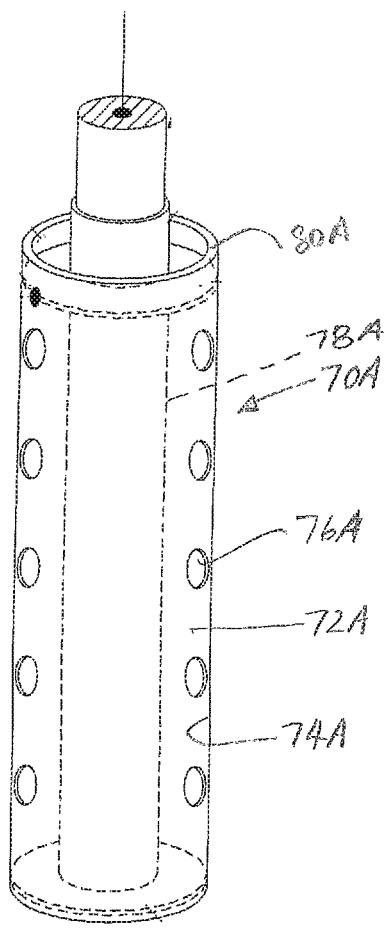
FIGS. 4A-4F are illustrations of capacitance sensors which have been treated along exposed surfaces with the anti-paraffin coating composition of the present invention.
Figure 4B:
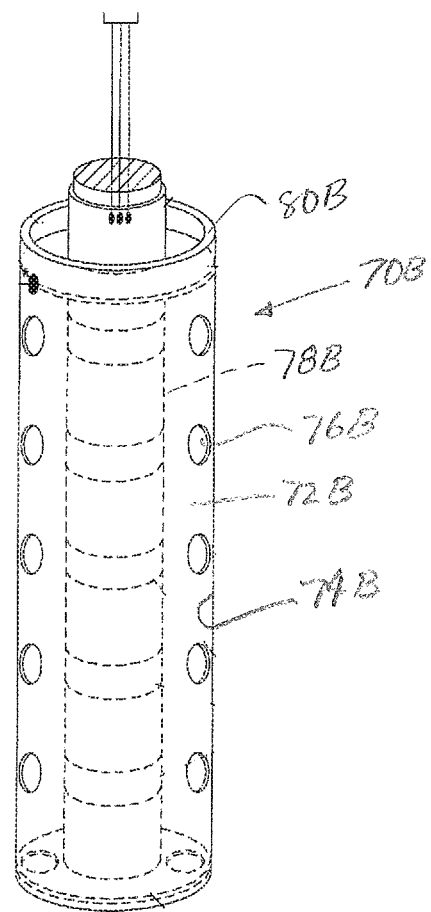
Figure 4C:
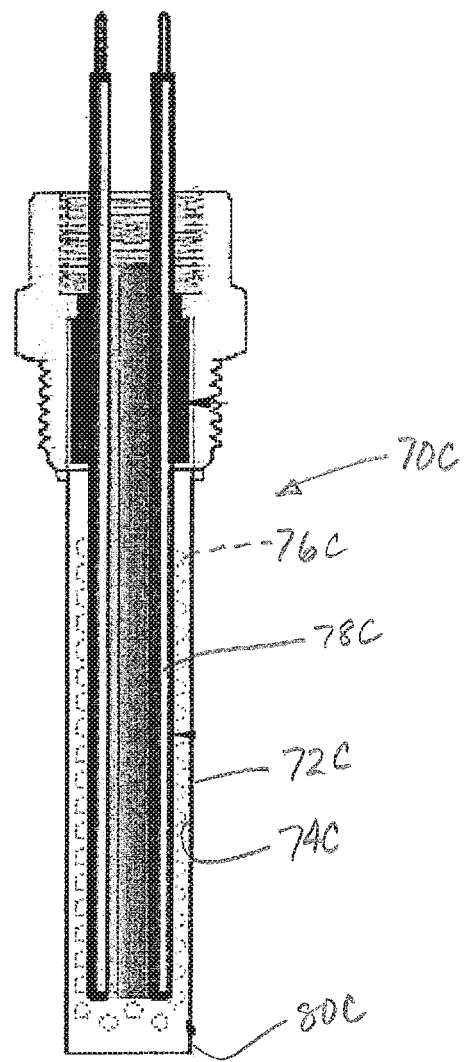
Figure 4F:
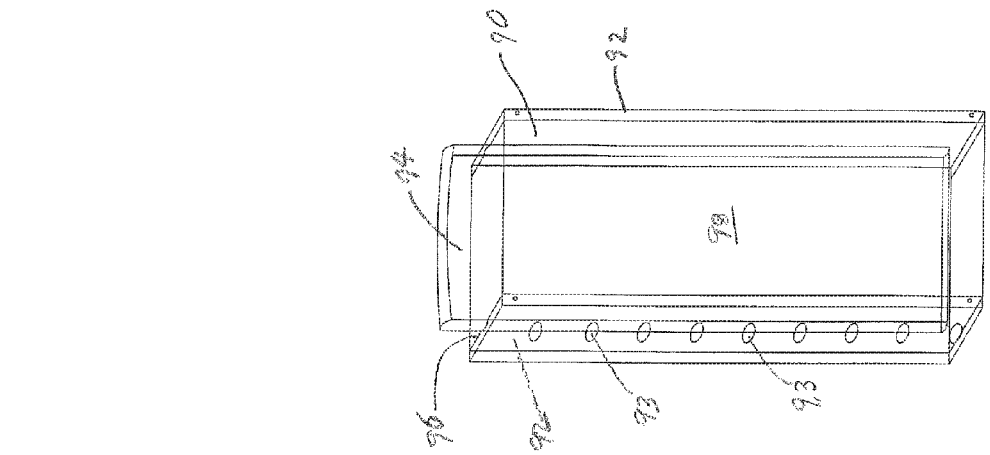
Figure 4E:
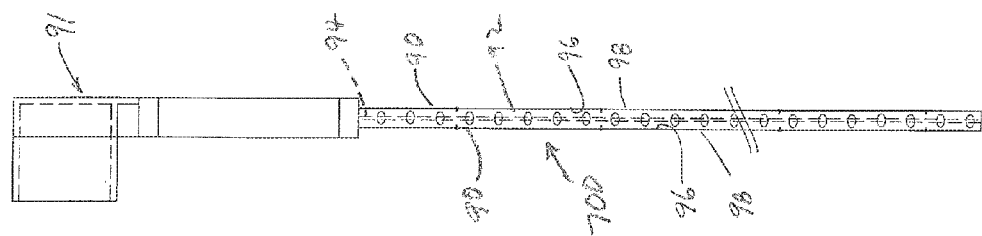
Figure 4D:
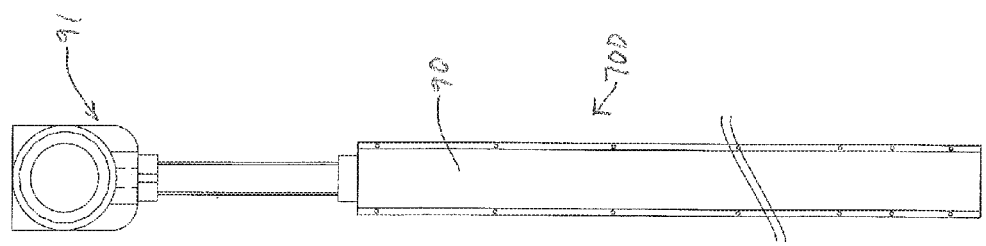

According to the present inventive method, capacitance sensors 70A, 70B, 70C and 70D as shown in FIGS. 4A-4F may be treated as described above. The nano-treatment chemical composition (SAMP) is directly applied to the clean outer surfaces 72A, 72B, 72C, 72D; the inner surfaces 74A-74D; and core elements 78A-78D as described above. It may be further understood that openings 76A, 76B, and 76C in FIGS. 4A-4C allow crude oil to flow through the sensors, 70A-70C and become exposed to the sensor core 78A-78C. In FIGS. 4D-4F, capacitance sensor 70D has a different, unique design wherein rather from utilizing a generally, cylindrical tube 80A-80C, as shown in FIGS. 4A-4C, two spaced-apart stainless steel plates 90 are held in a generally parallel relationship by two, perforated plastic sidewalls 92. A shrink wrapped printed circuit board sensor 94, with an explosion-proof head 91 attached to one end of the sensor, is disposed within the generally rectangular enclosure or housing formed by the two steel plates 90 and the perforated plastic side walls 92.

The nano-treatment chemical composition (SAMP) is applied to the inner surfaces 96 and outer surfaces 98 of the spaced-apart stainless steel plates 90. Crude oil flows through the perforation 93 in the sidewall 92 to be read by the sensor printed circuit board 94.

Excess SAMP composition residue is removed from the treated surfaces. With the sensors 70A, 70B, 70C and 70D, it is the utilization of the anti-paraffin composition along the surfaces exposed to the crude oil which reduces the paraffin build-up which may affect the sensitivity of the sensor.

In future applications involving larger scale factory coating processes, the manual system described above can easily be replaced with more automated processes, non-limiting examples of which include spray-type applicators and/or a tank dip system. A commercial embodiment of the present invention may comprise bulk supply and large scale application of primer/cleaner, coating chemical, and rinse/flush agents. The coatings of the present invention may be designed for coating a wider range of metal as well as non-metal surfaces (including glass, polymers, etc.).

Figure 2:
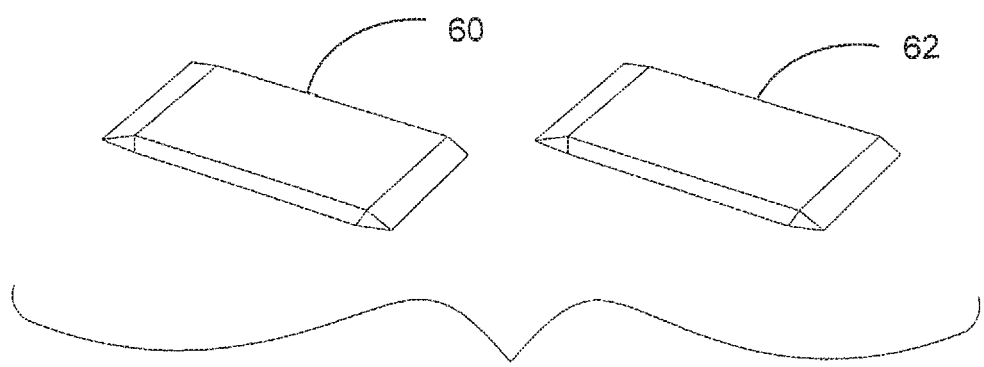
FIG. 2 is the perspective view of a foil packet of the present inventive kit.

In another non-limiting embodiment, a kit may be employed wherein individual wipes 60 and 62 (FIG. 2) are separately sealed and robustly packaged to withstand long-term storage and handling. Wipe 60 is a cleaning wipe having an alcohol or phosphate-based detergent. Wipe 62 is impregnated with a SAMP composition appropriate for the application. The chemical components are non-toxic, REACH compliant (having approximately the same environmental characteristics as common isopropyl alcohol), and have no known adverse environmental impacts. No specialized training or Personal Protective Equipment (PPE) is required for use.

A proper application of the nano-coating composition produces a permanent molecular bond that is highly stable under normal ambient conditions. However, components subjected to turbulent flow profiles in which basic sediment index is high (abrasive service), or those subject to high acidity/temperature may require a re-application of the protective coating due to surface abrasion of the metal component.

It should be understood that the AP coating is monitored to evaluate the effectiveness of the SAMP composition coating. Recoating of components may be accomplished by cleaning, drying, and applying, as described above.

It should be understood that the SAMP composition of the present invention may be enhanced by the addition of tracer additives which impart a "tint" or color to treated components. Such "tinting" will result in an observable indication of the sufficiency of the component coating. As the "tint" intensity decreases, the operator will be able to determine if additional coating coverage is required. Further, enhancements may include additives to produce a wider range of component surface characterizations including, but to limited to, corrosion inhibitors, anti-static properties, and the like. As described above, utilization of a glycol-based carrier component to the SAMP composition may enhance crude oil process/service applications.

The present invention is useful for surfaces that come into contact with hydrocarbon liquids, including both crude oils and condensates, in which paraffins and/or asphaltenes are present or may become present.

Non-limiting examples of commercial applicability of the present invention include petroleum production, petroleum pipelines, petroleum equipment (storage tanks and specialty vessels, etc.), and petroleum sensor and instrument manufacturing.

The foregoing is considered as illustrative only of the principles of the invention. Further, since numerous modifications and changes will readily occur to those skilled in the art, it is not desired to limit the invention to the exact construction and operation shown and described.

Those skilled in the art will recognize other embodiments of the invention which may be drawn from the illustrations and the teachings herein. To the extent that such alternative embodiments are so drawn, it is intended that they shall fall within the ambit of protection of the claims appended hereto.

Having disclosed the invention in the foregoing specification and accompanying drawings in such a clear and concise manner, those skilled in the art will readily understand and easily practice the invention.

What is claimed is:

1. A method for installing a level sensor into a crude oil service operation, wherein the level sensor comprises an elongated tube having an outer surface and comprises a float carrier having an inner surface, wherein the outer surface and the inner surface are cooperating surfaces, and wherein at least one of the surfaces comprises a Self-Assembled Monolayer of Phosphonate (SAMP) composition, said SAMP composition reducing paraffin or asphaltene deposition on the at least one of the surfaces, the method comprising the step of:

Installing said level sensor into a section of a crude oil service operation.

2. The method of claim 1, wherein both of the surfaces comprises a Self-Assembled Monolayer of Phosphonate (SAMP) composition.

3. The method of claim 1, wherein the composition further comprises at least one of a tracer additive, corrosion inhibitor, or anti-static additive.

4. The method of claim 1, further comprising:
Contacting at least one of the surfaces with a crude oil.

5. The method of claim 1, further comprising:
Contacting at least one of the surfaces with a solid selected from the group consisting of paraffin and asphaltene.

6. The method claim 1, further comprising:
Precipitating a solid onto at least one of the surfaces, wherein the solid is selected from the group consisting of paraffin and asphaltene.

7. A level sensor comprising:
An elongated tube having an outer surface; and,
A float carrier having an inner surface;
Wherein the outer surface and the inner surface form cooperating surfaces, and wherein at least one of the surfaces comprises a Self-Assembled Monolayer of Phosphonate (SAMP), said SAMP reducing paraffin or asphaltene deposition on the at least one of the surfaces.

8. The level sensor of claim 7, wherein both of the surfaces comprise a Self-Assembled Monolayer of Phosphonate (SAMP).

9. The level sensor of claim 7, wherein at least one of the surfaces further comprises at least one of a tracer additive, corrosion inhibitor, or anti-static additive.

* * * * *